US011864291B2

United States Patent

(12) United States Patent
Fu et al.
(10) Patent No.: US 11,864,291 B2
(45) Date of Patent: Jan. 2, 2024

(54) LED CONTROL CIRCUIT AND LED ILLUMINATION SYSTEM

(71) Applicant: INVENTRONICS (HANGZHOU), INC., Zhejiang (CN)

(72) Inventors: Ping Fu, Zhejiang (CN); Delai Jiang, Zhejiang (CN)

(73) Assignee: INVENTRONICS (HANGZHOU), INC., Zhejiang (CN)

( * ) Notice: Subject to any disclaimer, the term of this patent is extended or adjusted under 35 U.S.C. 154(b) by 0 days.

(21) Appl. No.: 17/918,588

(22) PCT Filed: Jul. 7, 2021

(86) PCT No.: PCT/CN2021/104889
§ 371 (c)(1),
(2) Date: Oct. 13, 2022

(87) PCT Pub. No.: WO2022/057400
PCT Pub. Date: Mar. 24, 2022

(65) Prior Publication Data
US 2023/0144258 A1 May 11, 2023

(30) Foreign Application Priority Data
Sep. 16, 2020 (CN) ........................ 202010973139.X

(51) Int. Cl.
*H05B 45/375* (2020.01)
*H05B 45/345* (2020.01)

(52) U.S. Cl.
CPC ......... *H05B 45/375* (2020.01); *H05B 45/345* (2020.01)

(58) Field of Classification Search
CPC .... H05B 45/375; H05B 45/345; H05B 45/37; H02M 1/32; H02M 1/36; H02M 3/156; H02M 3/335
See application file for complete search history.

(56) References Cited

U.S. PATENT DOCUMENTS 6,037,755 A 3/2000 Mao et al.
9,973,083 B1 * 5/2018 Rose ....................... H02M 1/08
(Continued)

FOREIGN PATENT DOCUMENTS

CA 3010261 A1 * 12/2019
CN 101529983 A 9/2009
(Continued)

OTHER PUBLICATIONS

International Search Report for PCT/CN2021/104889 dated Sep. 28, 2021, ISA/CN.
(Continued)

*Primary Examiner* — Abdullah A Riyami
*Assistant Examiner* — Syed M Kaiser
(74) *Attorney, Agent, or Firm* — Yue (Robert) Xu; Apex Attorneys at Law, LLP

(57) ABSTRACT

An LED control circuit, comprising: an isolated DC-DC circuit having a first current loop and a voltage loop, said circuit being used for outputting a stable direct current voltage; and a buck circuit having a control unit; wherein the control unit is used for controlling the buck circuit to output constant current, so as to supply power to an LED load, and also used for controlling the buck circuit to not operate when the direct current voltage is less than a preset voltage, and controlling the buck circuit to operate when the direct current voltage is greater than or equal to the preset voltage.

8 Claims, 3 Drawing Sheets

(56) References Cited

U.S. PATENT DOCUMENTS

| | | | | |
|---|---|---|---|---|
| 2007/0229001 | A1 | 10/2007 | Mcintosh et al. | |
| 2012/0286755 | A1 | 11/2012 | Itou | |
| 2016/0150608 | A1 | 5/2016 | Kuang et al. | |
| 2017/0099011 | A1* | 4/2017 | Freeman | H02M 7/06 |
| 2021/0211066 | A1* | 7/2021 | Vavilpalli | H02J 3/48 |

FOREIGN PATENT DOCUMENTS

| | | | | | |
|---|---|---|---|---|---|
| CN | 101835317 | A | | 9/2010 | |
| CN | 201718099 | U | * | 1/2011 | |
| CN | 201718099 | U | | 1/2011 | |
| CN | 102548109 | A | | 7/2012 | |
| CN | 102723880 | A | | 10/2012 | |
| CN | 102769960 | A | | 11/2012 | |
| CN | 104378887 | A | | 2/2015 | |
| CN | 104955201 | A | | 9/2015 | |
| CN | 109660120 | A | | 4/2019 | |
| CN | 210444530 | U | * | 5/2020 | F21K 9/272 |
| CN | 112040608 | A | | 12/2020 | |
| JP | 2019075218 | A | | 5/2019 | |

OTHER PUBLICATIONS

S. Iturriaga-Medina et al., "A buck converter controller design in an electronic drive for LED lighting applications", IEEE, Nov. 4, 2015.

Liao Zhiling et al., "A LED driving power supply based on buck-boost cascade quadtype buck topology", Power Supply Technology and Its Application, 2018,44(1) :143-146.

* cited by examiner

LED CONTROL CIRCUIT AND LED ILLUMINATION SYSTEM

The present application is the national phase of International Patent Application No. PCT/CN2021/104889, titled "LED CONTROL CIRCUIT AND LED ILLUMINATION SYSTEM", filed on Jul. 7, 2021, which claims priority to Chinese Patent Application No. 202010973139.X, titled "LED CONTROL CIRCUIT AND LED ILLUMINATION SYSTEM", filed on Sep. 16, 2020 with the Chinese Patent Office, both of which are incorporated herein by reference in their entireties.

FIELD

The present disclosure relates to the technical field of LED lighting, and in particular to an LED control circuit and an LED lighting system.

BACKGROUND

At present, an LED (Light Emitting Diode) driving power usually includes two stage circuits, such as a front-stage isolated DC-DC circuit and a rear-stage BUCK circuit. Reference is made to FIG. 1, which is a structural diagram of an isolated DC-DC circuit in an LED control circuit. To ensure the normal operation of the LED control circuit, a constant voltage module and a current limiting protection module are usually arranged in the isolated DC-DC circuit. With the constant voltage module, the isolated DC-DC circuit can operate in a constant voltage mode, in which the isolated DC-DC circuit provides a direct current voltage with a constant amplitude for the BUCK circuit. The current limiting protection module operates in a current limiting protection mode when an output current of the isolated DC-DC circuit is greater than a predetermined value, causing the isolated DC-DC circuit operates with a reduced power and protecting electrical components. Since a feedback loop of the constant voltage module is a voltage loop and a feedback loop of the current limiting protection module is a current loop, and the voltage loop and the current loop compete with each other, it is generally determined by using diodes D1 and D2 of the isolated DC-DC circuit whether the current loop or the voltage loop to operate.

In the LED control circuit, a limited current of the isolated DC-DC circuit operating in the current limiting protection mode is usually less than a constant current outputted by the BUCK circuit. The output voltage of the BUCK circuit is less than the input voltage of the BUCK circuit, and the input voltage is the output voltage of the isolated DC-DC circuit. In the present disclosure, the output voltage of the BUCK circuit (that is, a voltage of an LED load) is determined by the LED load. Under the control of the conventional LED control circuit, the front-stage circuit and the rear-stage circuit start in sequence. When the output voltage of the isolated DC-DC circuit rises to a value, the BUCK circuit starts to operate. Since the switch tube of the BUCK circuit usually operates with a maximum duty cycle, as the output current of the BUCK circuit increases, the output current of the isolated DC-DC circuit is similar to the output current of the BUCK circuit and increases accordingly. Therefore, in a case that the two currents rise to the limited current of the isolated DC-DC circuit without reaching the constant current of the BUCK circuit, the current loop in the isolated DC-DC circuit starts to operate, thus the isolated DC-DC circuit operates in the current limiting protection mode, that is, in a state of outputting with a reduced power. The isolated DC-DC circuit outputting with a reduced power cannot meet the input power requirements of the BUCK circuit, the output current of the BUCK circuit cannot continuously rise, and then the current loop cannot perform a closed-loop operation, resulting in the BUCK circuit cannot provide a constant current for the LED load.

Therefore, the technical problem that the current loop of the front-stage isolated DC-DC circuit begins to operate before the current loop of the BUCK circuit in the LED control circuit performs a closed-loop operation is urgently to be solved by those skilled in the art.

SUMMARY

In view of this, an LED control circuit and an LED lighting system are provided according to the present disclosure to solve the problem that the current loop of the front-stage isolated DC-DC circuit begins to operate before the current loop of the BUCK circuit in the LED control circuit performs a closed-loop operation. The following solutions are provided.

An LED control circuit is provided according to the present disclosure. The LED control circuit includes: an isolated DC-DC circuit and a BUCK circuit. The isolated DC-DC circuit is arranged with a first current loop and a voltage loop, and is configured to convert an output voltage of a power grid to output a direct current voltage. The BUCK circuit is arranged with a control unit. The control unit is configured to control the BUCK circuit to output a constant current to supply power to an LED load, control the BUCK circuit not to operate in a case that the direct current voltage is less than a predetermined voltage, and control the BUCK circuit to start to operate in a case that the direct current voltage is greater than or equal to a predetermined voltage.

In an embodiment, the predetermined voltage is equal to a rated output voltage of the isolated DC-DC circuit.

In an embodiment, the control unit includes a first detection unit, a second detection unit, and a control IC unit. The first detection unit is connected in parallel with an output terminal of the isolated DC-DC circuit, and is configured to detect the direct current voltage and feedback the direct current voltage to the control IC unit. The second detection unit is connected in series with the BUCK circuit, and is configured to detect a target current at an output terminal of the BUCK circuit and feedback the target current to the control IC unit. The control IC unit is configured to control the BUCK circuit not to operate by using a switch tube in the BUCK circuit in a case that the direct current voltage is less than the predetermined voltage, control the BUCK circuit to operate by using the switch tube in a case that the direct current voltage is greater than or equal to the predetermined voltage, and control the BUCK circuit to output the constant current based on the target current.

In an embodiment, the control IC unit includes a comparator, a second current loop, and a driving control subunit. The comparator is configured to compare the direct current voltage with the predetermined voltage to obtain a target level signal, and transmit the target level signal to the driving control subunit. The second current loop is configured to input a target feedback signal to the driving control subunit based on the target current and a predetermined current. The driving control subunit is configured to output a target driving signal based on the target level signal and the target feedback signal, output the target driving signal to the switch tube to control the BUCK circuit to operate or not to operate, and output the constant current.

In an embodiment, the first detection unit includes a first resistor and a second resistor. A second terminal of the first resistor is connected to a first terminal of the second resistor, a first terminal of the first resistor is connected to an input terminal of the BUCK circuit, and a second terminal of the second resistor is connected to another input terminal of the BUCK circuit.

In an embodiment, the second detection unit is a third resistor. The third resistor is connected in series with an output terminal of the BUCK circuit.

In an embodiment, the switch tube is integrated with the control IC unit.

In an embodiment, the LED control circuit further includes a subtractor. The subtractor is configured to perform a subtraction operation to obtain a detection result of the second detection unit and feedback the detection result to the second current loop.

An LED lighting system is further provided according to the present disclosure. The LED lighting system includes the LED control circuit described above.

It can be seen that in the LED control circuit according to the present disclosure, the control unit may control the BUCK circuit not to operate in a case that the direct current voltage outputted by the isolated DC-DC circuit is less than the predetermined voltage, control the BUCK circuit to start to operate in a case that the direct current voltage outputted by the isolated DC-DC circuit is greater than or equal to the predetermined voltage, and control the BUCK circuit to output a constant current to supply power to an LED load. With the LED control circuit according to the present disclosure, it is ensured that the BUCK circuit starts to operate only after the voltage loop in the isolated DC-DC circuit performs a closed-loop operation. Thus, the second current loop in the BUCK circuit may perform a closed-loop operation while the isolated DC-DC circuit is operating in the constant voltage mode, and provide a stable constant current for the LED load, thereby solving the problem that the current loop of the front-stage isolated DC-DC circuit begins to operate before the current loop of the BUCK circuit in the LED control circuit performs a closed-loop operation. Correspondingly, the LED lighting system according to the present disclosure also has the above beneficial effects.

BRIEF DESCRIPTION OF THE DRAWINGS

In order to more clearly explain technical solutions in the embodiments of the present disclosure or in the conventional technology, the accompanying drawings referred to for describing the embodiments or the conventional technology are briefly described hereinafter. Apparently, the accompanying drawings in the following description are only embodiments of the present disclosure. Other drawings may be obtained for those of ordinary skill in the art based on the provided drawings without any creative efforts.

DETAILED DESCRIPTION OF THE EMBODIMENTS

The technical solutions in the embodiments of the present disclosure will be clearly and completely described hereinafter with reference to the drawings in the embodiments according to the present disclosure. Apparently, the described embodiments are only a part of the embodiments of the present disclosure, but not all of the embodiments. Based on the embodiments in the present disclosure, all other embodiments obtained by those of ordinary skill in the art without creative effects fall within the protection scope of the present disclosure.

Figure 1:
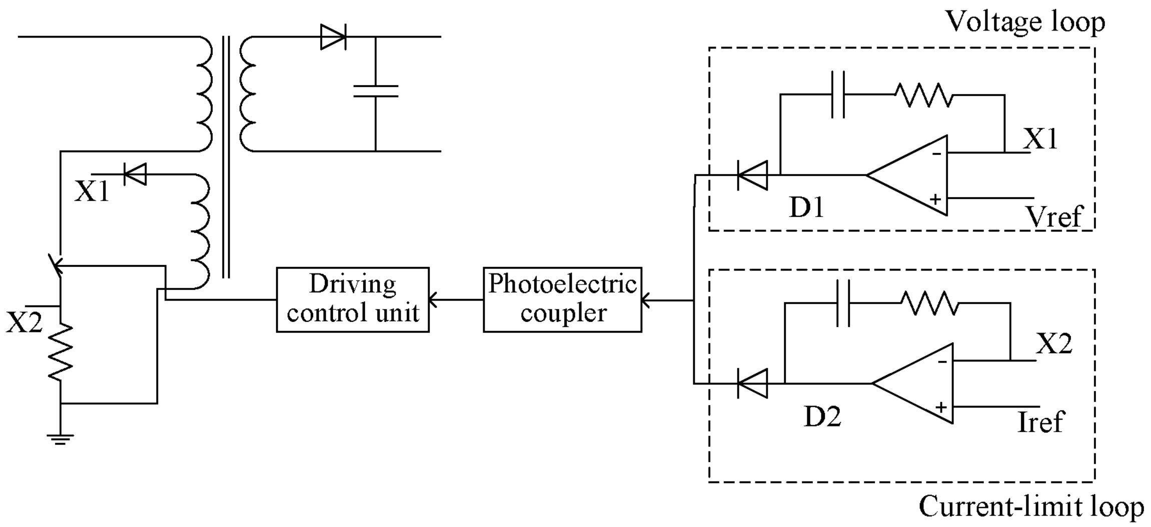
FIG. 1 is a structural diagram of an isolated DC-DC circuit in an LED control circuit.
Figure 2:
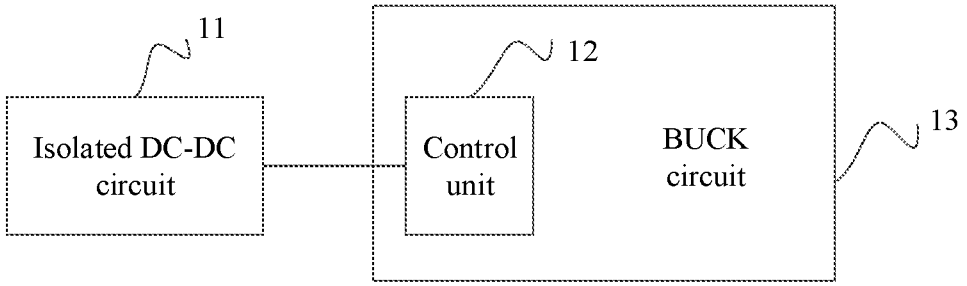
FIG. 2 is a structural diagram of an LED control circuit according to an embodiment of the present disclosure.

Reference is made to FIG. 2, which is a structural diagram of an LED control circuit according to an embodiment of the present disclosure. The LED control circuit includes: an isolated DC-DC circuit 11 and a BUCK circuit 13. The isolated DC-DC circuit 11 is arranged with a first current loop and a voltage loop, and is configured to convert an output voltage of a power grid to output a direct current voltage. The BUCK circuit 13 is arranged with a control unit 12. The control unit 12 is configured to control the BUCK circuit to output a constant current to supply power to an LED load, control the BUCK circuit 13 not to operate in a case that the direct current voltage is less than a predetermined voltage, and control the BUCK circuit 13 to start to operate in a case that the direct current voltage is greater than or equal to a predetermined voltage.

In the embodiment, a new LED control circuit is provided. With the LED control circuit, the problem that the current loop of the front-stage isolated DC-DC circuit 11 begins to operate before the current loop of the BUCK circuit in the LED control circuit performs a closed-loop operation can be solved.

Specifically, a front-stage isolated DC-DC circuit 11 and a rear-stage BUCK circuit 13 are arranged in the LED control circuit. The front-stage isolated DC-DC circuit 11 is arranged with a first current loop and a voltage loop, and is configured to convert an output voltage of a power grid to output a direct current voltage. The rear-stage BUCK circuit 13 is arranged with a second current loop, and is configured to convert the direct current voltage outputted by the front-stage isolated DC-DC circuit 11 to a constant current and supply power to an LED load. Since the functions and structures of the front-stage isolated DC-DC circuit 11 and the rear-stage BUCK circuit 13 are same as the functions and structures of the front-stage isolated DC-DC circuit and the rear-stage BUCK circuit in the LED control circuit according to the conventional technology, the front-stage isolated DC-DC circuit 11 and the rear-stage BUCK circuit 13 are not described in detail in the embodiments of the present disclosure.

In the embodiment, in addition to the front-stage isolated DC-DC circuit 11 and the rear-stage BUCK circuit 13 arranged in the LED control circuit, a control unit 12 is further arranged in the BUCK circuit. The control unit 12 controls the rear-stage BUCK circuit 13 to stop operating in a case that the output voltage of the front-stage isolated DC-DC circuit 11 is less than a predetermined voltage, and control the rear-stage BUCK circuit 13 to start to operate in a case that the output voltage of the front-stage isolated DC-DC circuit 11 is greater than or equal to a predetermined voltage, so that the rear-stage BUCK circuit 13 outputs a constant current to supply power to the LED load.

It should be understood that the control unit 12 controls the rear-stage BUCK circuit 13 to start to operate in the case that the direct current voltage outputted by the front-stage isolated DC-DC circuit 11 is greater than or equal to the predetermined voltage. That is, only after the isolated DC-DC circuit 11 operates in the constant voltage mode (that is, after the voltage loop is closed) the rear-stage BUCK circuit 13 starts to operate and supplies power to the LED load. Apparently, with the above configuration according to the embodiments of the present disclosure, the problem that the current loop of the front-stage isolated DC-DC circuit 11 begins to operate before the current loop of the BUCK circuit 13 in the LED control circuit performs a closed-loop operation can be solved.

It can be seen that in the LED control circuit according to the embodiments of the present disclosure, the control unit may control the BUCK circuit not to operate in a case that the direct current voltage outputted by the isolated DC-DC circuit is less than the predetermined voltage, control the BUCK circuit to start to operate in a case that the direct current voltage outputted by the isolated DC-DC circuit is greater than or equal to the predetermined voltage, and control the BUCK circuit to output a constant current to supply power to an LED load. With the LED control circuit according to the embodiments of the present disclosure, it is ensured that the BUCK circuit starts to operate only after the voltage loop in the isolated DC-DC circuit performs a closed-loop operation. Thus, the second current loop in the BUCK circuit may perform a closed-loop operation while the isolated DC-DC circuit is operating in the constant voltage mode, and provide a stable constant current for the LED load, thereby solving the problem that the current loop of the front-stage isolated DC-DC circuit begins to operate before the current loop of the BUCK circuit in the LED control circuit performs a closed-loop operation.

Based on the above embodiments, the technical solution is further described and optimized in an embodiment of the present disclosure. In a preferred embodiment, the predetermined voltage is equal to a rated output voltage of the isolated DC-DC circuit 11.

In the embodiment, the predetermined voltage is set as the rated output voltage of the front-stage isolated DC-DC circuit 11. In a case that the predetermined voltage is set as the rated output voltage of the front-stage isolated DC-DC circuit 11, the control unit 12 control the rear-stage BUCK circuit 13 to start to operate only after the voltage loop of the front-stage isolation DC-DC circuit 11 is closed. That is, only in a case that the front-stage isolated DC-DC circuit 11 operates in a voltage loop operation mode, the rear-stage BUCK circuit 13 starts to operate, thereby avoiding the problem that the current loop of the front-stage isolated DC-DC circuit 11 begins to operate before the current loop of the BUCK circuit 13 in the LED control circuit performs a closed-loop operation.

Figure 3:
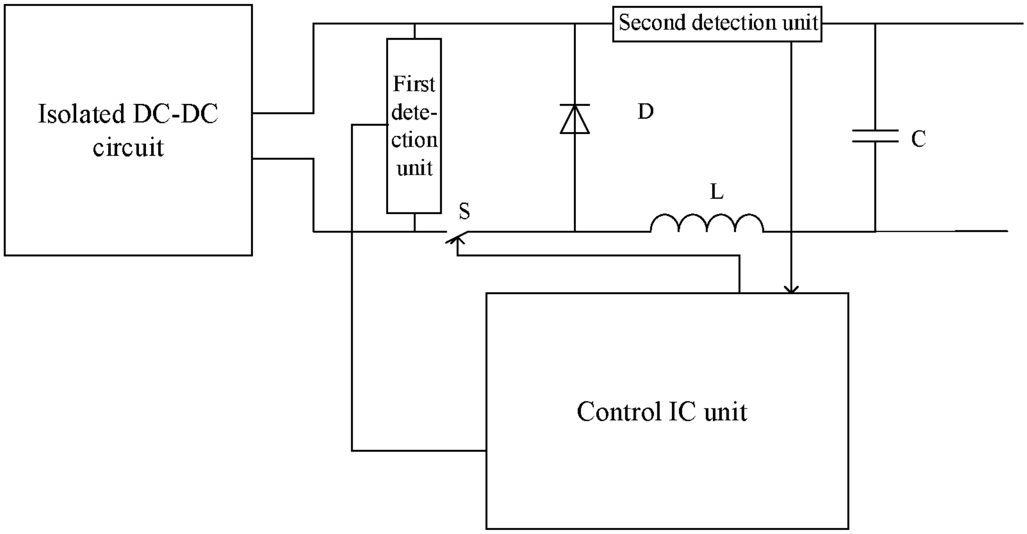
FIG. 3 is a circuit topology diagram of an LED control circuit according to an embodiment of the present disclosure.

Based on the above embodiments, the technical solution is further described and optimized in an embodiment of the present disclosure. Reference is made to FIG. 3, which is a circuit topology diagram of an LED control circuit according to an embodiment of the present disclosure. In an embodiment, the control unit 12 includes a first detection unit, a second detection unit, and a control IC unit. The first detection unit is connected in parallel with an output terminal of the isolated DC-DC circuit 11, and is configured to detect the direct current voltage and feedback the direct current voltage to the control IC unit. The second detection unit is connected in series with the BUCK circuit, and is configured to detect a target current at an output terminal of the BUCK circuit and feedback the target current to the control IC unit. The control IC unit is configured to control the BUCK circuit not to operate by using a switch tube in the BUCK circuit in a case that the direct current voltage is less than the predetermined voltage, control the BUCK circuit to operate by using the switch tube in a case that the direct current voltage is greater than or equal to the predetermined voltage, and control the BUCK circuit to output the constant current based on the target current.

With the LED control circuit shown in FIG. 3, the operation principle of the LED control circuit according to the present disclosure is illustrated in detail based on the topology structure, including a switch tube S, a diode D, a capacitor C and an inductor L, of the rear-stage BUCK circuit. In the LED control circuit according to the embodiments of the present disclosure, the control unit 12 includes a first detection unit, a second detection unit and a control IC unit.

Specifically, the first detection unit is connected in parallel with the front-stage isolated DC-DC circuit, and is configured to detect the direct current voltage outputted by the front-stage isolated DC-DC circuit, and feedback the direct current voltage outputted by the front-stage isolated DC-DC circuit to the control IC unit. The second detection unit is connected in series with the rear-stage BUCK circuit, and is configured to detect a target current at an output terminal of the BUCK circuit and feedback the target current at the output terminal of the BUCK circuit to the control IC unit.

After receiving the direct current voltage outputted by the front-stage isolated DC-DC circuit detected by the first detection unit and the target current at the output terminal of the BUCK circuit detected by the second detection unit, the control IC unit determines whether the direct current voltage outputted by the front-stage isolated DC-DC circuit is less than the predetermined voltage. In a case that the direct current voltage outputted by the front-stage isolated DC-DC circuit is less than the predetermined voltage, the control IC unit does not transmit a driving signal to the switch tube S, then the rear-stage BUCK circuit does not start to operate. In a case that the direct current voltage outputted by the front-stage isolated DC-DC circuit is greater than or equal to the predetermined voltage, the control IC unit transmits a driving signal to the switch tube S, the rear-stage BUCK circuit starts to operate, and the control IC unit controls the output current of the rear-stage BUCK circuit based on the target current from the output terminal of the rear-stage BUCK circuit, so that the rear-stage BUCK circuit outputs a constant current with a stable amplitude to supply power to the LED load.

In an embodiment, the control IC unit includes a comparator, a second current loop, and a driving control subunit. The comparator is configured to compare the direct current voltage with the predetermined voltage to obtain a target level signal, and transmit the target level signal to the driving control subunit. The second current loop is configured to input a target feedback signal to the driving control subunit based on the target current and a predetermined current. The driving control subunit is configured to output a target driving signal based on the target level signal and the target feedback signal, output the target driving signal to the switch tube to control the BUCK circuit to operate or not to operate, and output the constant current.

Figure 4:
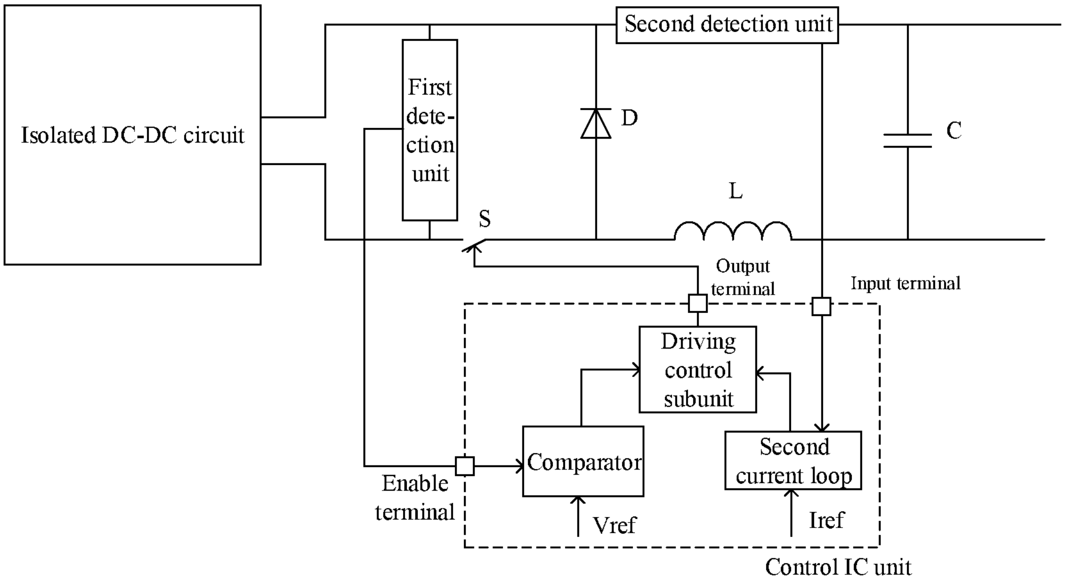
FIG. 4 is a circuit topology diagram of an LED control circuit according to another embodiment of the present disclosure.

Reference is made to FIG. 4, which is a circuit topology diagram of an LED control circuit according to another embodiment of the present disclosure. In the embodiment, a functional logic of the control IC unit is performed by arranging the comparator, the second current loop and the driving control subunit in the control IC unit.

Specifically, the first detection unit inputs the detected direct current voltage outputted by the front-stage isolated DC-DC circuit to the comparator via an enable terminal of the control IC unit. The comparator compares the direct current voltage outputted by the front-stage isolated DC-DC circuit with the predetermined voltage Vref to obtain a target level signal, and transmits the target level signal to the driving control subunit. The second detection unit inputs the detected target current at the output terminal of the rear-stage BUCK circuit to the second current loop via the output terminal of the control IC unit. The second current loop inputs a target feedback signal to the driving control subunit based on the target current at the output terminal of the BUCK circuit and a predetermined current Iref. After receiving the target level signal from the comparator and the target feedback signal from the second current loop, the driving control subunit outputs a target driving signal based on the target level signal and the target feedback signal, and feeds back the target driving signal to the switch tube S via the output terminal of the control IC unit to control the rear-stage BUCK circuit not to operate by controlling the switch tube S to operate in an off state or control the BUCK circuit to start to operate by controlling the switch tube S to be closed, so that so that the rear-stage BUCK circuit provides a stable constant current to the LED load.

That is, in a case of determining that the direct current voltage outputted by the front-stage isolated DC-DC circuit is less than the predetermined voltage based on the target level signal and the target feedback signal, the driving control sub-unit controls the rear-stage BUCK circuit to stop operating; and in a case of determining that the direct current voltage outputted by the front-stage isolated DC-DC circuit is greater than or equal to the predetermined voltage based on the target level signal and the target feedback signal, the driving control sub-unit controls the rear-stage BUCK circuit to start to operate. Thus, the rear-stage BUCK circuit outputs a constant current to supply power to the LED load.

With the technical solutions according to the embodiments of the present disclosure, the accuracy and reliability of the control IC unit in performing the logic functions can be further ensured.

In an embodiment, the first detection unit includes a first resistor R1 and a second resistor R2. A second terminal of the first resistor R1 is connected to a first terminal of the second resistor R2, a first terminal of the first resistor R1 is connected to an input terminal of the BUCK circuit, and a second terminal of the second resistor R2 is connected to another input terminal of the BUCK circuit.

Figure 5:
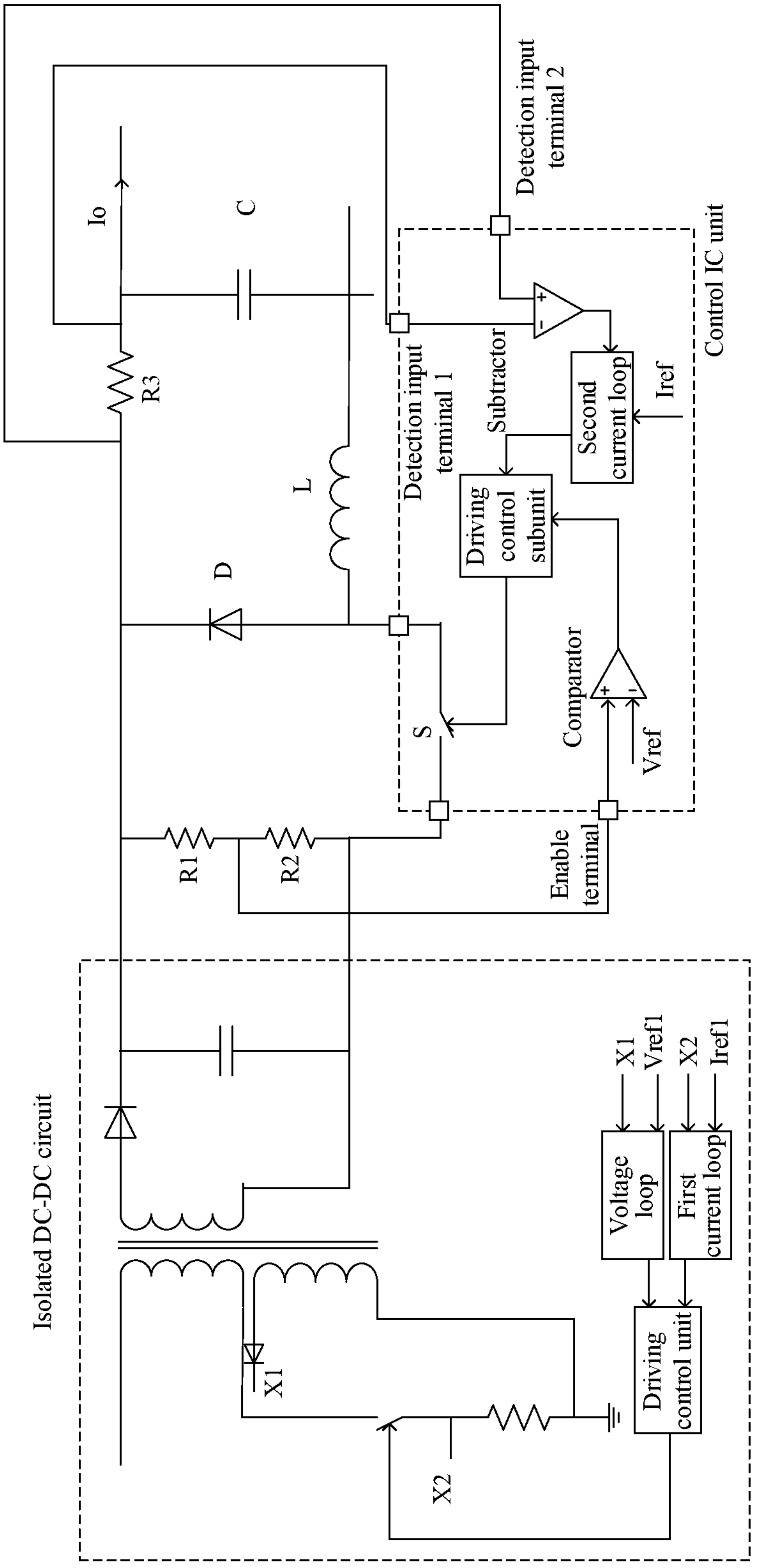
FIG. 5 is a circuit topology diagram of an LED control circuit according to another embodiment of the present disclosure.

Reference is made to FIG. 5, which is a circuit topology diagram of an LED control circuit according to another embodiment of the present disclosure. In the embodiment, the first detection unit is configured as a resistor division structure, that is, the current and voltage outputted by the front-stage isolated DC-DC circuit are detected by using the voltage division unit formed by the first resistor R1 and the second resistor R2.

With the technical solutions according to the embodiment of the present disclosure, a simple and easy circuit structure of the first detection unit can be achieved.

In an embodiment, the second detection unit is a third resistor R3. The third resistor is connected in series with an output terminal of the BUCK circuit.

In the embodiment, the third resistor R3 is configured as the second detection unit. That is, the target current at the output terminal of the BUCK circuit is detected by using the third resistor R3 connected in series in the BUCK circuit. It can be understood that the control circuit can be further simplified with the structure configured for the second detection unit.

In an embodiment, the switch tube S is integrated with the control IC unit.

In actual operations, reference is made to FIG. 5, which is a schematic diagram of a structure in which a switch tube S is arranged in a control IC unit. That is, the switch tube S and the control IC unit are integrated together. It can be understood that a concise structure of the control circuit can be achieved with the above configuration.

With the technical solutions according to the embodiments of the present disclosure, flexible and various configurations of the switch tube can be achieved.

In an embodiment, the LED control circuit further includes a subtractor. The subtractor is configured to perform a subtraction operation to obtain a detection result of the second detection unit and feedback the detection result to the second current loop.

In actual operations, a detection result obtained by the second detection unit may be collected by the subtractor. Referring to FIG. 5, in a case that the third resistor R3 is configured as the second detection unit, the subtractor may be connected to both terminals of the third resistor R3 to collect the detection result detected by the second detection unit, and the subtractor may feedback the target current at the output terminal of the rear-stage BUCK circuit detected by the second detection unit to the second current loop.

In addition, since the subtractor has stable and reliable operation performance and low design cost, the cost of LED control circuit can be reduced with the above configuration.

Correspondingly, an LED lighting system is further provided according to an embodiment of the present disclosure. The LED lighting system includes the LED control circuit described above.

With the LED lighting system according to the embodiment of the present disclosure, the beneficial effects of the LED control circuit described above can be achieved.

The embodiments in the description are described in a progressive manner. Each of the embodiments is mainly focused on describing its differences from other embodiments, and references may be made among these embodiments with respect to the same or similar parts. Finally, it should be further illustrated that a relation term such as "first" and "second" herein is only used to distinguish one entity or operation from another entity or operation, and does not necessarily require or imply that there is an actual relation or sequence between these entities or operations. Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. Unless explicitly limited, the statement "including a . . . " does not exclude the case that other similar elements may exist in the process, the method, the article or the device other than enumerated elements.

The LED control circuit and the LED lighting system according to the present disclosure are introduced in detail above. The principles and implementations of the present disclosure are described with specific examples. The above descriptions of the embodiments are only used to facilitate understanding of the method and the core idea of the present disclosure. In addition, for those skilled in the art, variations may be made to the embodiments and the application range based on the idea of the present disclosure. Therefore, the specification should not be understood as limitation of the present disclosure.

The invention claimed is:

1. An LED control circuit, comprising:

an isolated DC-DC circuit, arranged with a first current loop and a voltage loop and configured to convert an output voltage of a power grid to output a direct current voltage; and a BUCK circuit, arranged with a control unit, wherein the control unit is configured to control the BUCK circuit to output a constant current to supply power to an LED load, control the BUCK circuit not to operate in a case that the direct current voltage is less than a predetermined voltage, and control the BUCK circuit to start to operate in a case that the direct current voltage is greater than or equal to a predetermined voltage;

wherein the control unit comprises a first detection unit, a second detection unit, and a control IC unit;

the first detection unit is connected in parallel with an output terminal of the isolated DC-DC circuit, and is configured to detect the direct current voltage and feedback the direct current voltage to the control IC unit;

the second detection unit is connected in series with the BUCK circuit, and is configured to detect a target current at an output terminal of the BUCK circuit and feedback the target current to the control IC unit; and the control IC unit is configured to control the BUCK circuit not to operate by using a switch tube in the BUCK circuit in a case that the direct current voltage is less than the predetermined voltage, control the BUCK circuit to operate by using the switch tube in a case that the direct current voltage is greater than or equal to the predetermined voltage, and control the BUCK circuit to output the constant current based on the target current.

2. The LED control circuit according to claim 1, wherein the predetermined voltage is equal to a rated output voltage of the isolated DC-DC circuit.

3. The LED control circuit according to claim 1, wherein the control IC unit comprises a comparator, a second current loop, and a driving control subunit;

the comparator is configured to compare the direct current voltage with the predetermined voltage to obtain a target level signal, and transmit the target level signal to the driving control subunit;

the second current loop is configured to input a target feedback signal to the driving control subunit based on the target current and a predetermined current; and the driving control subunit is configured to output a target driving signal based on the target level signal and the target feedback signal, output the target driving signal to the switch tube to control the BUCK circuit to operate or not to operate, and output the constant current.

4. The LED control circuit according to claim 1, wherein the first detection unit comprises a first resistor and a second resistor; and a second terminal of the first resistor is connected to a first terminal of the second resistor, a first terminal of the first resistor is connected to an input terminal of the BUCK circuit, and a second terminal of the second resistor is connected to another input terminal of the BUCK circuit.

5. The LED control circuit according to claim 1, wherein the second detection unit is a third resistor, and the third resistor is connected in series with an output terminal of the BUCK circuit.

6. The LED control circuit according to claim 1, wherein the switch tube is integrated with the control IC unit.

7. The LED control circuit according to claim 3, further comprising:

a subtractor, configured to perform a subtraction operation to obtain a detection result of the second detection unit and feedback the detection result to the second current loop.

8. An LED lighting system, comprising the LED control circuit according to claim 1.

* * * * *